United States Patent
Lindoff et al.

(10) Patent No.: US 8,249,011 B2
(45) Date of Patent: Aug. 21, 2012

(54) SIGNAL RECEPTION IN WIRELESS COMMUNICATION SYSTEMS USING AUTOMATIC REPEAT REQUEST TRANSMISSIONS

(75) Inventors: Bengt Lindoff, Bjärred (SE); Matthias Kamuf, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 440 days.

(21) Appl. No.: 12/635,304

(22) Filed: Dec. 10, 2009

(65) Prior Publication Data

US 2011/0002277 A1 Jan. 6, 2011

Related U.S. Application Data

(60) Provisional application No. 61/222,784, filed on Jul. 2, 2009.

(51) Int. Cl.
*H04W 72/04* (2009.01)
(52) U.S. Cl. .................. 370/329; 370/336; 370/341
(58) Field of Classification Search .................. 370/329, 370/339, 341
See application file for complete search history.

(56) References Cited

FOREIGN PATENT DOCUMENTS

WO 2008/036280 A2 3/2008

OTHER PUBLICATIONS

3rd Generation Partnership Project. "Proposals for the Uplink Scheduling." 3GPP TSG-RAN WG2 ad-hoc on LTE, R2-061900, Cannes, France, Jun. 27-30, 2006.
3rd Generation Partnership Project. "UL HARQ Behaviour with Dynamic Adaptive/Non-Adaptive Operation." 3GPP TSG-RAN WG1 Meeting #51, R1-074928 (R2-074854), Jeju, Korea, Nov. 5-9, 2007.

*Primary Examiner* — Dang Ton
*Assistant Examiner* — Pamit Kaur
(74) *Attorney, Agent, or Firm* — Coats & Bennett, P.L.L.C.

(57) ABSTRACT

A wireless communication transceiver compensates a given received signal for retransmission interference, if (uncompensated) decoding of the given received signals fails. The transceiver estimates the retransmission interference bearing on the given received signal based on hypothesizing that another user (or users) mistakenly transmitted in the same time interval, using some or all of the same channel resources as were allocated to the given received signal. The transceiver may retain information in any given interval, indicating the channel allocations used for those user signals successfully received in that interval. The retained information allows the transceiver to determine, with respect to a given signal received in a current time interval, which other users would be interfering users if they mistakenly retransmitted in the current time interval. The transceiver may target its compensated decoding, which may be iterative, to the most likely and/or most significant ones of the potentially of interfering user(s).

22 Claims, 8 Drawing Sheets

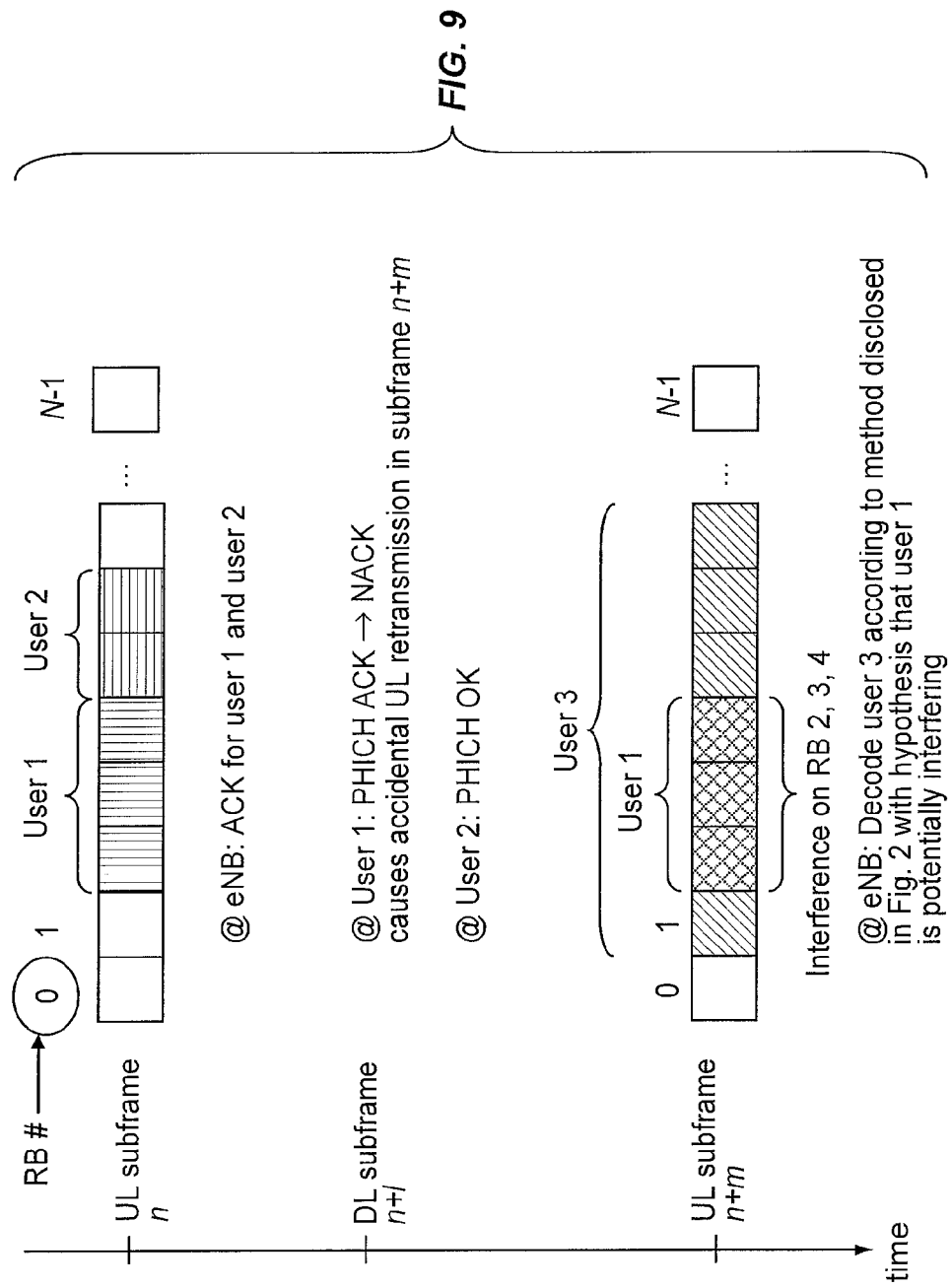

SIGNAL RECEPTION IN WIRELESS COMMUNICATION SYSTEMS USING AUTOMATIC REPEAT REQUEST TRANSMISSIONS

RELATED APPLICATIONS

This application claims priority from the U.S. provisional application filed on 2 Jul. 2009, and now assigned App. No. 61/222,784.

BACKGROUND

Wireless communication networks of various types use forms of Automatic Repeat reQuest (ARQ) response signaling. With ARQ, transmissions from a given transmitter are acknowledged or not acknowledged, depending on whether they are successfully received. Non-acknowledgments prompt the transmitter to retransmit using, for example, the same channel resources that were allocated for its original transmission.

According to the LTE standards, as promulgated by the Third Generation Partnership Project (3GPP), LTE networks use Hybrid ARQ (H-ARQ). As an example, given mobile terminals or other types of User Equipment (UE) transmit to an eNodeB in one or more LTE subframes, according to uplink assignment grants made by the eNodeB. An assignment grant allocates particular OFDM channel resources to particular users. Thus, in ongoing operation, the eNodeB receives some number of user signals in each of a series of repeating LTE subframes, and sends ARQ responses to each transmitting user, in dependence on whether that user's signal was successfully received (decoded) by the eNodeB.

In more detail, in 3GPP Release 8, for LTE, an eNodeB sends an H-ARQ response signal on the Physical H-ARQ Indicator Channel (PHICH), wherein an acknowledgment response—sometimes referred to as an "ack"—indicates that the user signal transmitted on the uplink to the eNodeB by a given User Equipment (UE) was successfully decoded. Conversely, a non-acknowledgment response—sometimes referred to as a "nack"—indicates that the user signal was not successfully decoded.

In Frequency-Division Duplexing (FDD) mode, the eNodeB receives some number of user signals in a given LTE subframe, and sends ARQ response signals corresponding to those signals four subframes later, as a PHICH group transmitted on the PHICH. The determination of the PHICH group, as well as the different spreading sequences used to differentiate the different ARQ responses by targeted UEs, is determined based on the locations of the corresponding uplink assignments used for the transmissions being acknowledged. The PHICH is mapped on OFDM symbol "0" for normal durations, or 0, 1, and 2 for extended durations.

To efficiently utilize the available resources, the ARQ responses (ack or nack signals) for up to eight UEs can be multiplexed into a single PHICH group, and there are several such PHICH groups available. The number of PHICH groups depends on the system bandwidth and a semi-static parameter called Ng that dynamically accounts for changes in the number of users. There are at least two PHICH groups (1.4 MHz and Ng=⅙) and at most twenty-five (20 MHz and Ng=2) present in the control region of an LTE subframe.

The LTE standards define the target probabilities for a given UE misinterpreting an ack signal as a nack signal, and vice versa. The target probabilities are defined in terms of Bit Error Rates (BERs) or Block Error Rates (BLERs), for example.

SUMMARY

To understand the issue of a misinterpretation of an ack signal as a nack signal by a given UE, consider that an eNodeB allocates specific channel resources to a given UE, for its use in transmitting to the eNodeB in a given LTE subframe. If that transmission is successfully received by the eNodeB, it acknowledges that reception and considers those channel resources as being available for other use. However, if the first UE misinterprets the eNodeB's acknowledgment of its reception as a non-acknowledgment, it will retransmit using the same channel resources given that there was no explicit indication of Downlink control information (DCI) Format 0 on the Physical Downlink Control Channel (PDCCH). As those resources may, at the time of the mistaken retransmission, be allocated to one or more other users, the mistaken retransmission can substantially interfere with the reception by the eNodeB of those other user signals.

With the above example in mind, according to one or more aspects of the teachings presented herein, a wireless communication transceiver compensates a given received signal for retransmission interference, at least where (uncompensated) decoding of the given received signals fails. The transceiver estimates the retransmission interference bearing on the given received signal based on hypothesizing that another user (or users) mistakenly retransmitted in the same time interval, using some or all of the same channel resources as were allocated to the given received signal.

As a non-limiting example, the transceiver may retain information in any given interval, indicating the channel allocations used for those user signals successfully received in that interval. That retained information allows the transceiver to determine, with respect to a given signal received in a current time interval, which other users would be interfering users if they mistakenly retransmitted in the current time interval.

Further, in at least one embodiment, the transceiver retains information about the reliability at which it sends acknowledgment signals, so that it can later identify most likely potentially interfering users, and generates compensating retransmission interference estimates for one or more of the most likely potential interferers. For example, if a given user was acknowledged in a prior interval at a lowered reliability (e.g., at a transmit power computed for a higher BLER target), it is more likely that that particular user misinterpreted the acknowledgment as a non-acknowledgment.

Additionally, or alternatively, the transceiver identifies the most significant potentially interfering users, and generates compensating retransmission interference estimates for one or more of the most significant potentially interfering users. For example, mistaken retransmissions by users from the prior interval that shared a larger percentage or amount of the same channel resources as used by the given received signal in the current time period would cause more interference. Such users are considered to be more significant sources of potential retransmission interference.

With the above in mind, one embodiment presented herein comprises a method of decoding user signals in a wireless communication transceiver. The method comprises receiving a first user signal in a current time interval, on channel resources allocated to the first user signal in the current time interval, and decoding the first user signal by initially decoding the first user signal without compensating for retransmission interference. If said initial decoding of the first user signal fails, the method provides for performing compensated decoding.

Compensated decoding comprises hypothesizing that a potentially interfering user mistakenly retransmitted in the current time interval on some or all of the same channel resources allocated to the first user signal, and correspondingly generating an estimate of retransmission interference. Processing continues with obtaining a compensated first user signal by compensating the first user signal according to the estimated retransmission interference, and decoding the compensated first user signal.

In another embodiment, a wireless communication transceiver is configured to receive and decode user signals. The wireless communication transceiver comprises receiver circuits configured to receive a first user signal in a current time interval, on channel resources allocated to the first user signal in the current time interval, and decoding and control circuits.

The decoding and control circuits are configured to initially decode the first user signal without compensating for retransmission interference, and, if the initial decoding fails, perform compensated decoding of the first user signal. For compensated decoding, the decoding and control circuits are configured to hypothesize that a potentially interfering user mistakenly retransmitted in the current time interval on some or all of the same channel resources allocated to the first user signal, and correspondingly generate an estimate of retransmission interference.

Further, the decoding and control circuits are configured to obtain a compensated first user signal by compensating the first user signal according to the estimated retransmission interference, and decode the compensated first user signal. In at least one embodiment, the decoding and control circuits perform an iterative compensated decoding. For example, there may be more than one other user that would have interfered with the first user signal, assuming that such users mistakenly retransmitted in the current time interval. That is, different portions of the channel resources allocated to the first user signal in the current interval may have been allocated different users in a prior interval, such that any one or more of those other users would be interfering users in the current interval with respect to the first signal, if they mistakenly retransmitted in the current interval.

Thus, as a non-limiting example, the control circuit of the wireless communication transceiver is configured to generate a first retransmission interference estimate corresponding to the most likely and/or most significant one of the other potentially interfering users, compensate the first user signal for that first retransmission interference estimate, and then determine whether decoding is successful. If not, the control circuit hypothesizes that it was another one of the potentially interfering users—e.g., the next most likely and/or significant one—and it forms a corresponding retransmission interference estimate, compensates the first user signal accordingly, and attempts decoding with the newly compensated version of the first user signal. This process can be repeated for multiple hypotheses.

Further, the control circuit may hypothesize that more than one other potentially interfering user retransmitted in the current interval, and thus may compensate the user signal for two or more interfering retransmissions at a time. For example, the control circuit may generate an estimate of retransmission interference assuming another user mistakenly retransmitted on a first portion of the channel resources allocated to the first user signal, and generate another estimate of retransmission interference assuming yet another user mistakenly retransmitted on a second portion of the channel resources allocated to the first user signal. In this regard, compensating the first user signal comprises compensating different portions of the first user signal according to the different retransmission interference estimates.

Of course, the present invention is not limited to the above summary of features and advantages. Those skilled in the art will appreciate additional features and advantages of the present invention, upon reading the following detailed description of example embodiments, and upon viewing the accompanying drawings.

BRIEF DESCRIPTION OF THE DRAWINGS

FIG. 9 is an example diagram of a mistaken retransmission causing interference with respect to another user's signal, wherein retransmission interference compensation is carried out in accordance with the method of FIG. 2, for example.

DETAILED DESCRIPTION

Figure 1:
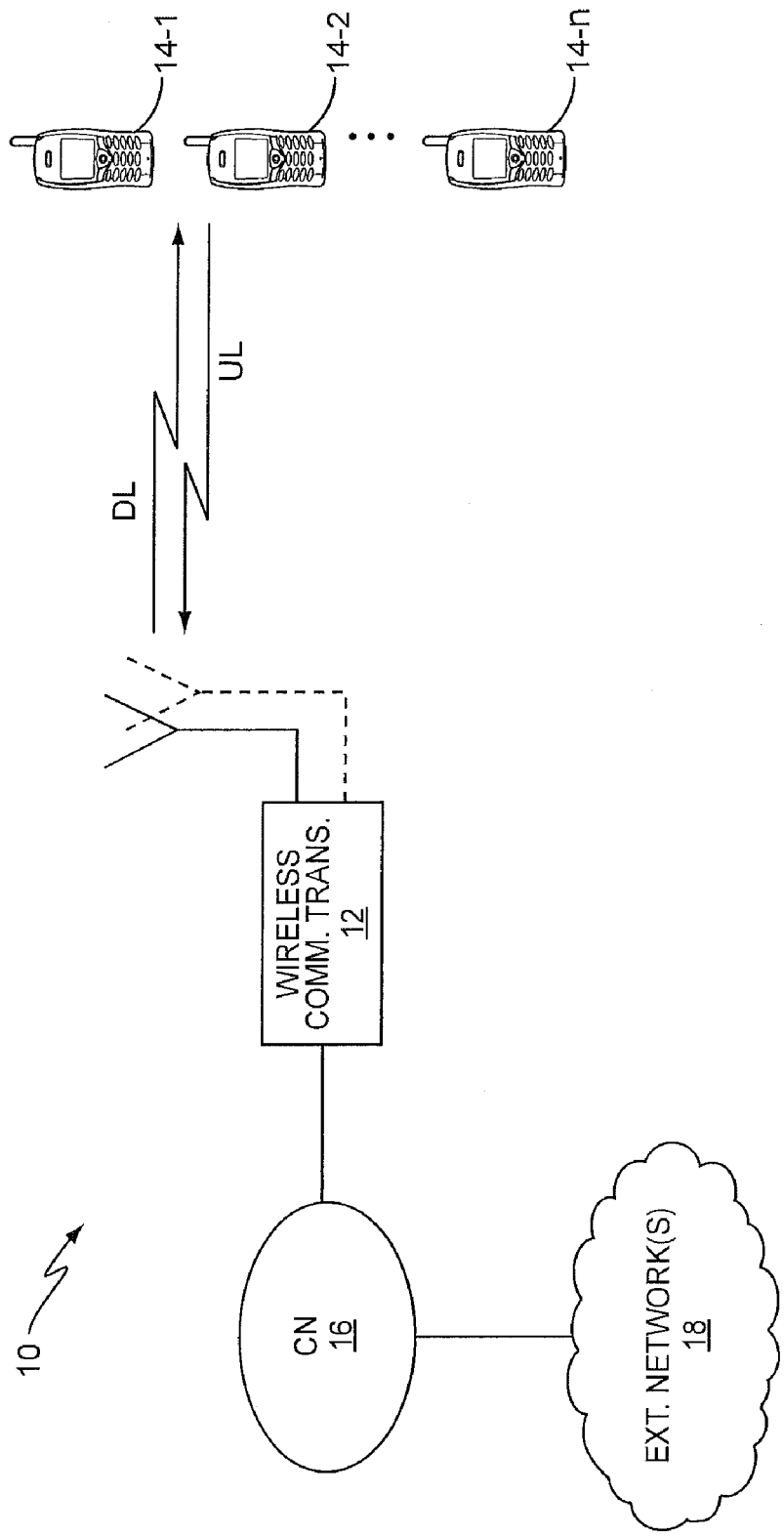
FIG. 1 is a block diagram of one embodiment of a wireless communication network that uses some form of ARQ, and includes one or more wireless communication transceivers that are configured for improved signal reception according to the teachings presented herein.

FIG. 1 illustrates a wireless communication network 10 that includes one or more wireless communication transceivers 12, each configured to transmit downlink (DL) control signals and data to a number of wireless communication transceivers 14 (e.g., 14-1, 14-2, etc.) and receive uplink (UL) transmissions from them. The network 10 further includes a core network (CN) 16, which communicatively couples the network 10 to one or more external networks 18, such as the Internet.

As a non-limiting example, the network 10 comprises a 3GPP LTE network, the wireless communication transceiver 12 ("transceiver 12") is an LTE eNodeB, and the wireless communication transceivers 14 ("transceivers 14") are LTE mobile terminals or other types of User Equipment (UE). Further, those skilled in the art will appreciate that FIG. 1 is simplified for ease of discussion; there may be multiple transceivers 12, each corresponding to and providing service in a given network cell, for example.

Figure 2:
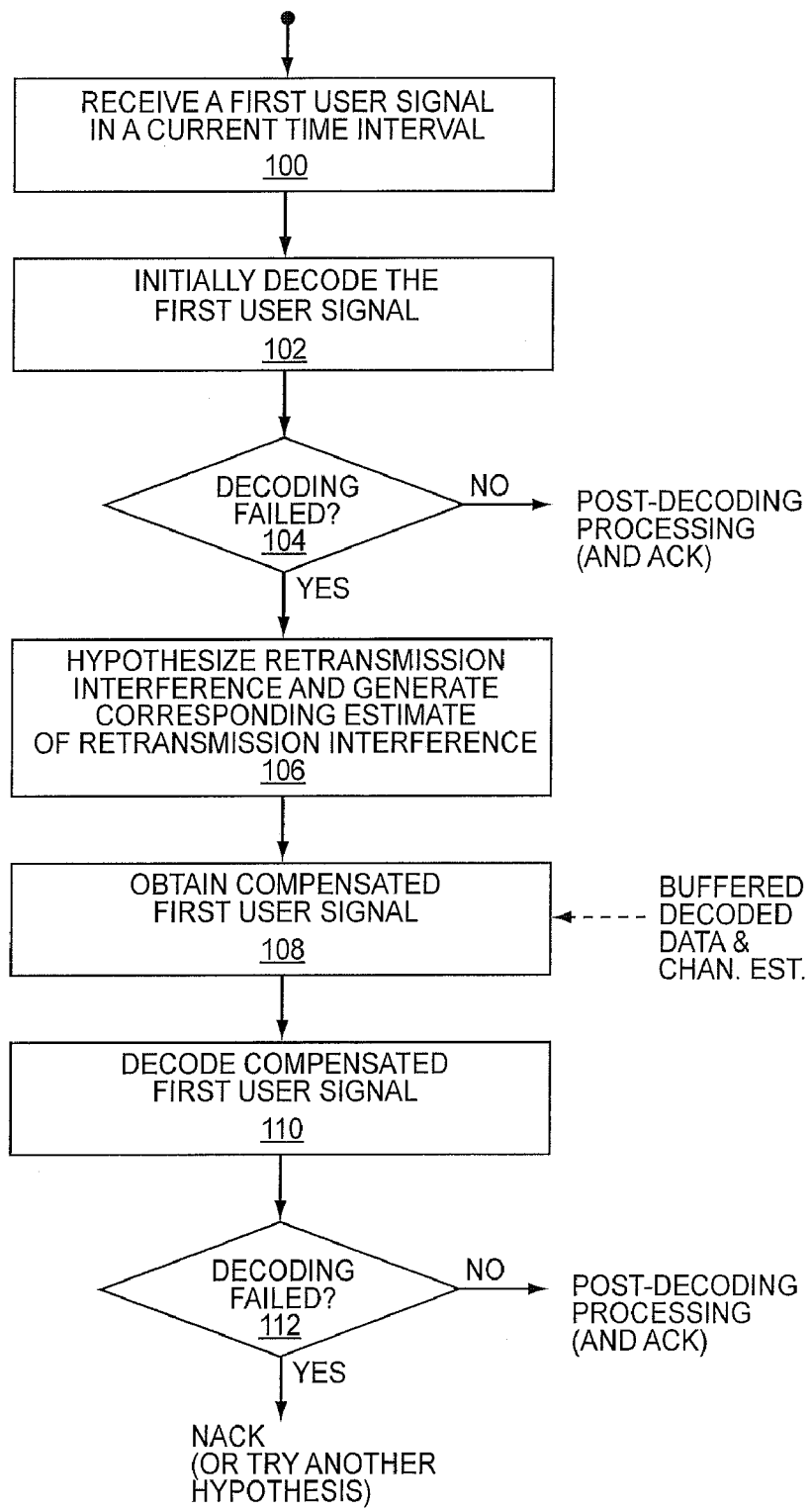
FIG. 2 is a logic flow diagram of one embodiment of a method of processing for improved signal reception at a wireless communication transceiver operating in a network that uses some form of ARQ.

In at least one embodiment, and with reference to FIG. 2, the illustrated wireless communication transceiver 12 ("transceiver 12") is configured to implement a method of decoding user signals that includes receiving a first user signal in a current time interval, on channel resources allocated to the first user signal in the current time interval (Block 100). Of course, the transceiver 12 may receive multiple user signals in each one of a series of succeeding or repeating transmission intervals, and may process each one of them similarly. Thus, the "first user signal" may be understood as any given one of potentially multiple user signals that are received and processed within the given, current time interval.

With that in mind, the method further includes decoding the first user signal by initially decoding the first user signal without compensating for retransmission interference (Block 102). Further, if the initial decoding of the first user signal fails (YES from Block 104), the method continues with performing compensated decoding (Blocks 106, 108, 110, 112). In particular, the transceiver 12 hypothesizes that a potentially interfering user mistakenly retransmitted in the current time interval on some or all of the same channel resources allocated to the first user signal and correspondingly generates an estimate of retransmission interference (Block 106). From there, the transceiver 12 obtains a compensated first user signal by compensating the first user signal according to the estimated retransmission interference (Block 108), and decodes the compensated first user signal (Block 110).

If decoding of the compensated first user signal succeeds (NO from Block 112), the transceiver 12 continues with its normal post-decoding processing, including acknowledgment signal generation. If decoding of the compensated first user signal fails (YES from Block 112), the transceiver 12 can generate a non-acknowledgment response, to prompt retransmission. However, in at least one embodiment, compensated decoding is an iterative process, and the transceiver 12 is configured to go back and try another retransmission interference hypothesis. For example, there may be three other users whose mistaken retransmissions would interfere with reception of the first user signal by the transceiver 12.

The transceiver 12 may compensate the first user signal for estimated retransmission interference of each individual one of those three other users, until it successfully decodes the user signal, and/or it may try various combinations, wherein it assumes that two of them retransmitted, or all three of them retransmitted.

In one embodiment, generating the estimate of retransmission interference comprises generating a channelized signal representing an estimate of what would have been received by the wireless communication transceiver if the potentially interfering user had mistakenly retransmitted in the current time interval, and generating the estimate of retransmission interference as a function of the channelized signal. Here, the channelized signal is a representation of what would have been received by the transceiver 12, based on its knowledge of what the mistakenly-retransmitting user previously transmitted on the channel resources at issue, and/or on what that user would have retransmitted in the current interval, and on its knowledge of the current-interval and/or prior-interval channel conditions of that other user.

As another example, the step of generating the estimate of retransmission interference comprises (for any one or more other users hypothesized as the mistakenly-retransmitting users) forming a regenerated signal at the wireless communication transceiver. The transceiver 12 forms the regenerated signal according to decoded data successfully obtained from an earlier-received user signal corresponding to the hypothesized mistaken retransmission and according to channel estimates determined for the earlier-received user signal. Then, the transceiver 12 generates the estimate of retransmission interference as a function of the regenerated signal.

As for the step of compensated decoding, in one or more embodiments, it includes identifying the potentially interfering user as one or more other users that transmitted one or more user signals to the transceiver 12 in a prior time interval, using some or all of the same channel resources as allocated to the first user signal in the current time interval. Further, in at least one embodiment, the method further includes determining which ones of said one or more other users are the most significant potential interferers, and performing the steps of obtaining (one or more compensated first user signals) and decoding (the one or more compensated first user signals) using the estimates of retransmission interference as generated for at least one of the most significant potential interferers.

A "most significant" potentially interfering user is one whose mistaken retransmission likely would cause the most reception interference with regard to the first user signal. As one example, a user that mistakenly retransmits on only a small number of the channel elements or other channel resources used for transmission of the first user signal likely would cause substantially less serious interference than a mistaken retransmission that nearly or completely overlaps with the first user signal's channel resource allocation(s).

Thus, in at least one embodiment, where there are multiple potentially interfering users, the transceiver 12 identifies the most significant one or ones, and compensates for that one or ones first. If there are a number of significant potential interferers, the transceiver 12 may compensate for each one in order of significance, or it may try different combinations of the most significant potential interferers first. For example, it could identify several potentially interfering users, rank them in order of significance, and then order its hypotheses and retransmission interference estimates according to that rank.

Additionally, or alternatively, compensated decoding includes determining which ones of said one or more other users are the most likely potential interferers based on reliabilities at which acknowledgement signals were sent to those one or more other users in the prior time interval, and performing the steps of obtaining (one or more compensated first user signals) and decoding (the one or more compensated first user signals) using the estimates of retransmission interference as generated for at least one of the most likely potential interferers.

As another example, in one or more embodiments, the step of hypothesizing comprises identifying, according to channel resource allocation and acknowledgment signal reliability information retained by the transceiver 12 from a prior time interval, one or more other users that successfully transmitted user signals to the transceiver 12 in the prior time interval using some or all of the same channel resources as allocated to the first user signal in the current time interval, and that are most likely to have mistakenly retransmitted in the current time interval.

In more detail, the transceiver 12 generally will operate with one or more performance targets relating to the reliability at which the transceivers 14 receive its acknowledgment and non-acknowledgment signals. The LTE standards, for example, set specific Block Error Rates (BLERs) for acknowledgment and non-acknowledgment signals sent by the transceiver 12 for UL transmissions from the transceivers 14. In practice, a given BLER or other reliability target maps into a required signal transmit power that changes dynamically with changing reception conditions. Thus, to the extent that the transceiver 12 is configured to conserve power in its ARQ signaling, or is power-limited in some sense with respect to its ARQ signaling, it may send a given ARQ response signal at less than the power required to achieve the targeted BLER. Such a transmission would be considered a "lowered reliability" transmission.

Similarly, whether undertaken because of power considerations, or for other reasons, the transceiver 12 may use different BLER or other reliability targets for different transceivers 14. To the extent that the transceiver 12 uses a lowered BLER or other reliability target for sending ARQ responses to one or more of the transceivers 14, those ARQ responses are considered to be comparatively lower in reliability than the ARQ responses that are sent according to higher BLER or other reliability targets. As an example, assuming two transceivers 14 had identical reception conditions, the power levels of acknowledgment responses sent by the transceiver 12 to both transceivers 14 would have equal transmit power if the same BLER target were used, but would have unequal transmit power if the BLER targets were different. Specifically, in this imagined scenario, the ARQ response being sent according to the lower BLER target would have a lower transmit power and would be considered a lowered reliability response, as compared to the other one.

In general, in one or more example embodiments, the transceiver 12 retains information in each given time interval that, in a subsequent time interval, allows it to identify: potentially interfering users in the subsequent interval; and identify which ones of those potentially interfering users are the most significant in terms of interference and/or the most likely ones to have mistakenly retransmitted. In at least one embodiment, for the reception of user signals in any given time interval, the transceiver 14 retains information indicating which ones of those user signals were successfully decoded and acknowledged. And, for that set of acknowledged user signals, the transceiver 14 further retains information indicating which channel resources were used by which signals, and, optionally, the relative or absolute reliability of the corresponding acknowledgment signals.

Of course, other embodiments encompassed by this disclosure contemplate other bases for generating the list or lists of potentially interfering users with respect to any given interval. As an example, in each time interval, the transceiver 12 stores (for each user signal received and acknowledged in that interval): the decoded signal; the corresponding channel estimates, the corresponding channel resource allocation information; and, optionally, the corresponding acknowledgment signal BLER or other reliability target. Of course, instead of storing the actual BLER or other reliability target, or transmit power level as an indication of acknowledgment reliability, the transceiver 12 may use a logical "reliability" level scale, and simply store a logical indicator, to indicate whether a given acknowledgment signal was or was not sent at a lowered reliability. Or, more detailed grading can be used, such as a two-bit logical flag that can be used to indicate four different levels of reliability. All such reliability indications may be "normalized" or otherwise referenced to nominal reliability levels that are defined by the controlling wireless communication standard. For example, Release 8 of the 3GPP LTE standards defines a BLER target of $10^{-3}$ for acknowledgment signals. In this context, any acknowledgment signal whose transmit power was below the level needed for achieving that targeted BLER could be considered a lower reliability signal.

Figure 3:
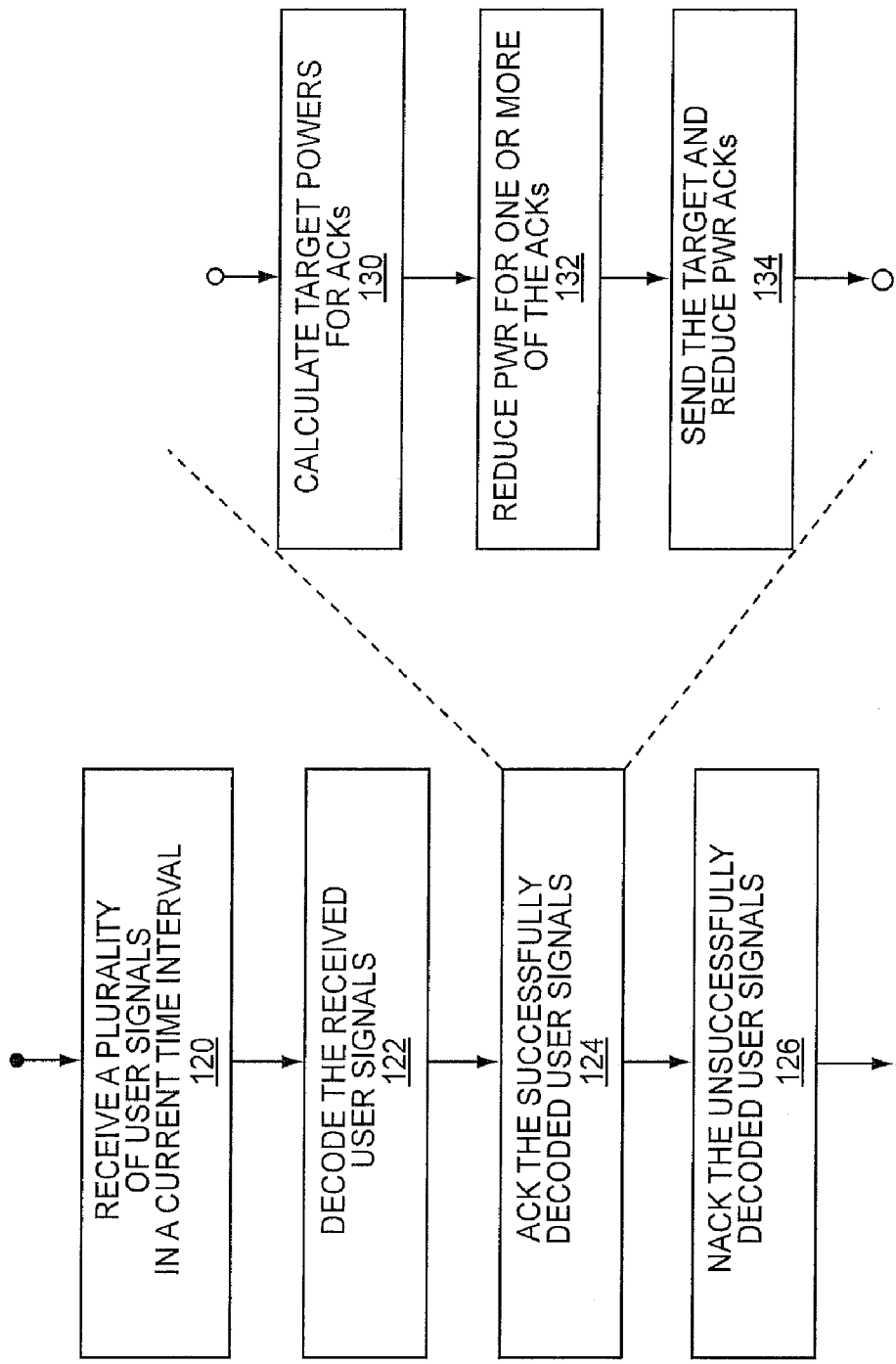
FIG. 3 is a logic flow diagram of one embodiment of a method of processing at a wireless communication transceiver, such as the one shown in FIG. 1, wherein the processing includes sending one or more acknowledgment signals at a lowered reliability, as may be done to reduce the overall power needed for ARQ response signaling.

FIG. 3 illustrates one embodiment of a compensated decoding method according to such processing. In the illustrated processing, the transceiver 12 receives a plurality of user signals in a current time interval (Block 120). It decodes the received user signals (Block 122), sends acknowledgment ("ack") signals for the successfully decoded ones of the received user signals (Block 124), and sends non-acknowledgment ("nack") signals for the unsuccessfully decoded user signals (Block 126). Here, it will be understood that the transceiver 12 would defer sending a nack for a given user signal until determining whether compensated decoding is successful.

Notably, Block 124 is exemplified by the more detailed Blocks 130, 132, 134, wherein the transceiver 12 calculates target powers for each acknowledgment signal to be transmitted (Block 130), e.g., based on a common BLER target and current reception conditions for the individual users being acknowledged. However, it may be assumed that the transceiver 12 is configured to reduce the transmit power level of one or more acknowledgment signals below the nominal value needed for the given BLER and current channel conditions. The transceiver 12 may do this because it is power limited in some sense, or because it is configured to strategically reduce its overall power consumption, such as for environmental or economic reasons.

In any case, according to this example embodiment the transceiver 12 reduces the transmit power setting for one or more of the acknowledgement signals (Block 132), and thus sends the overall set of acknowledgment signals for the given interval, with some at their targeted powers and some at reduced powers (Block 134). Also, rather than using a common BLER for the generation of all acknowledgment signals, the transceiver 12 may use a lowered BLER for acknowledging one or more user signals, which naturally leads to lower transmit powers than would be used for acknowledging at higher reliabilities.

Figure 4:
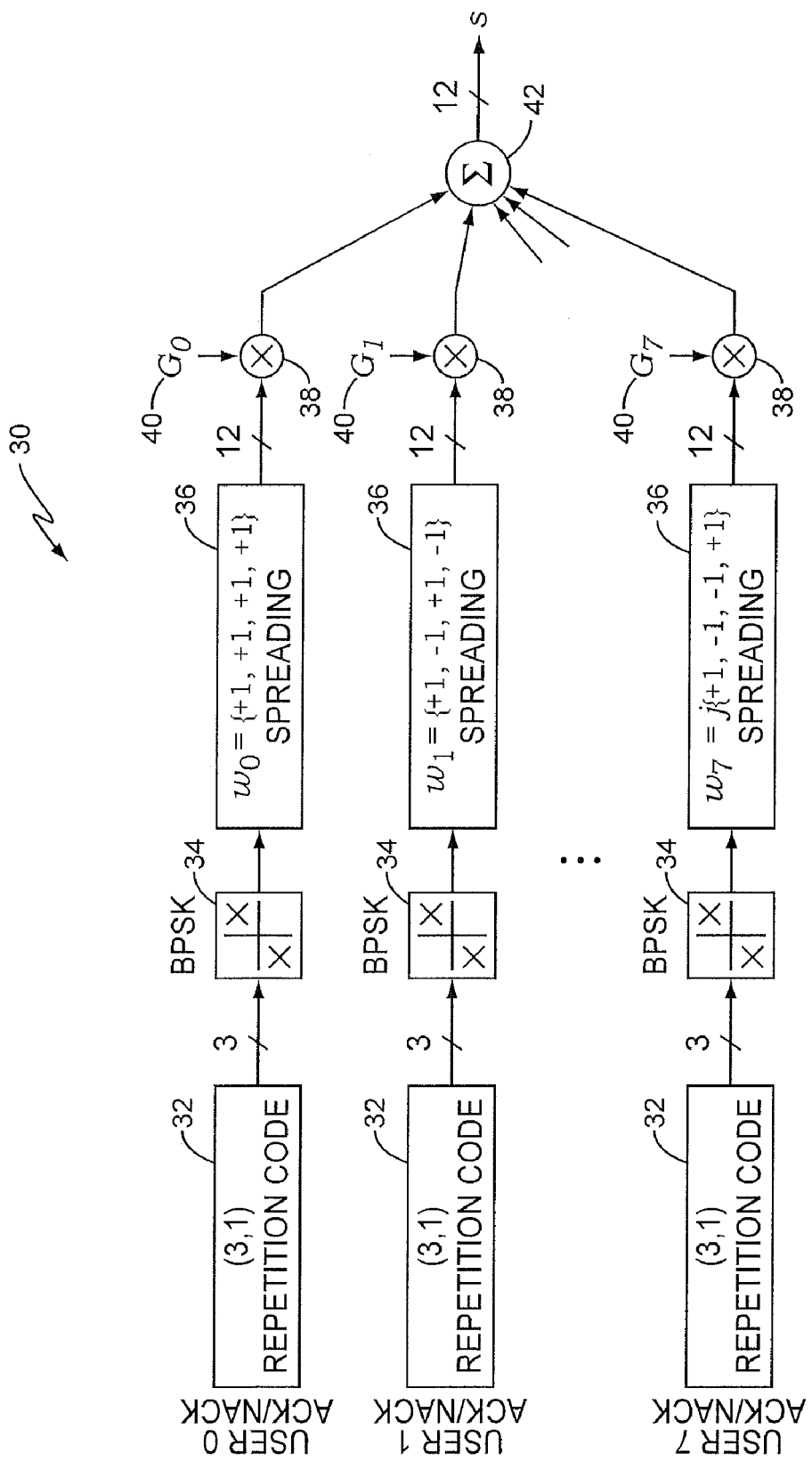
FIG. 4 is a block diagram of one embodiment of transmission coding circuits, such as may be included in the wireless communication transceiver of FIG. 1, wherein the illustrated circuits include a gain control for adjusting ARQ response signal transmit powers, such as may be used to send ARQ response signals at lowered reliabilities.

FIG. 4 illustrates coding and transmission circuits 30, which are included in the transceiver 12 in one or more embodiments, wherein the illustrated circuitry allows the transceiver 12 to lower the power/reliability of individual user acknowledgment signals as needed or desired. In the illustration, one sees an example where ARQ responses are generated for up to eight users (User 0 ... User 7). Coding circuits 32 generate encoded ack or nack bits for each user, and each such set of coded bits is mapped to a corresponding BSPK symbol by mapping circuits 34. The resultant BPSK symbol for each user is then spread in a spreading circuit 36, and than amplified in a multiplier circuit 40, by a amplification scale factor $G_x$, where "x" corresponds to a respective one of the users. The amplified signals are then combined in a combining circuit 42, in preparation for transmit processing in the transmit circuits 38.

Assuming that the gain value $G_x$ refers to signal amplitude, the value of $(G_x)^2$ can be manipulated to set the desired transmit power level. For example, the gain value $G_x$ or, equivalently the power $(G_x)^2$, for user x can be computed according to the nominal power requirement as set by a given nominal BLER requirement, and then decreased as desired. Or, the gain value can be computed according to a lowered BLER.

As such, in at least one embodiment, the compensated decoding method taught herein includes receiving some number of user signals in each of a series of repeating time intervals. And, for the user signals received in any current one of the time intervals, the method includes decoding the user signals and generating Automatic Repeat reQuest (ARQ)

response signals for individual ones of them in dependence on whether decoding succeeds or fails. Further, the method includes retaining information indicating the channel resource allocations used for those user signals that were successfully decoded, and indicating reliabilities or differences in reliabilities for at least some of the ARQ response signals sent for those user signals that were successfully decoded. Further, the method includes using the retained information from a prior time interval in a subsequent time interval, to identify potentially interfering users with respect to a given user signal that fails decoding.

Figure 5:
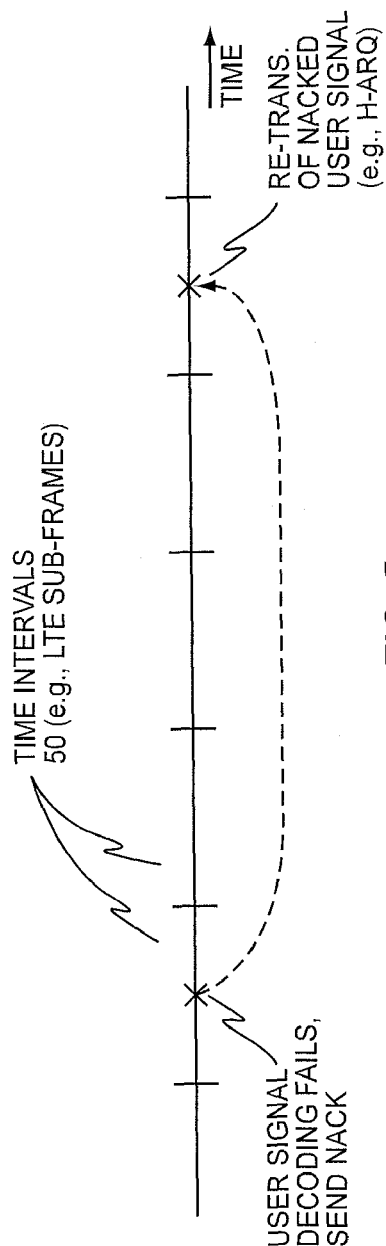
FIG. 5 is a plot of example timing for original transmissions and corresponding retransmissions, illustrated in terms of transmission interval times, e.g., subframe times.

Of course, not all embodiments of the contemplated method of compensated decoding require the retention of acknowledgment signal reliability information in each given time interval. More broadly, FIG. 5 depicts a series of repeating time intervals 50, wherein the transceiver 12 receives some number of user signals in each interval 50. According to the defined ARQ framework, a user whose signal is "nacked" in a given one of the intervals 50 retransmits in a later time interval, using the previously allocated channel resources. The number of time intervals between the original transmission and the retransmission generally is deterministic, or otherwise known, and the transceiver 12 incorporates such retransmissions into its scheduling operations and corresponding channel resource allocations.

Figure 6:
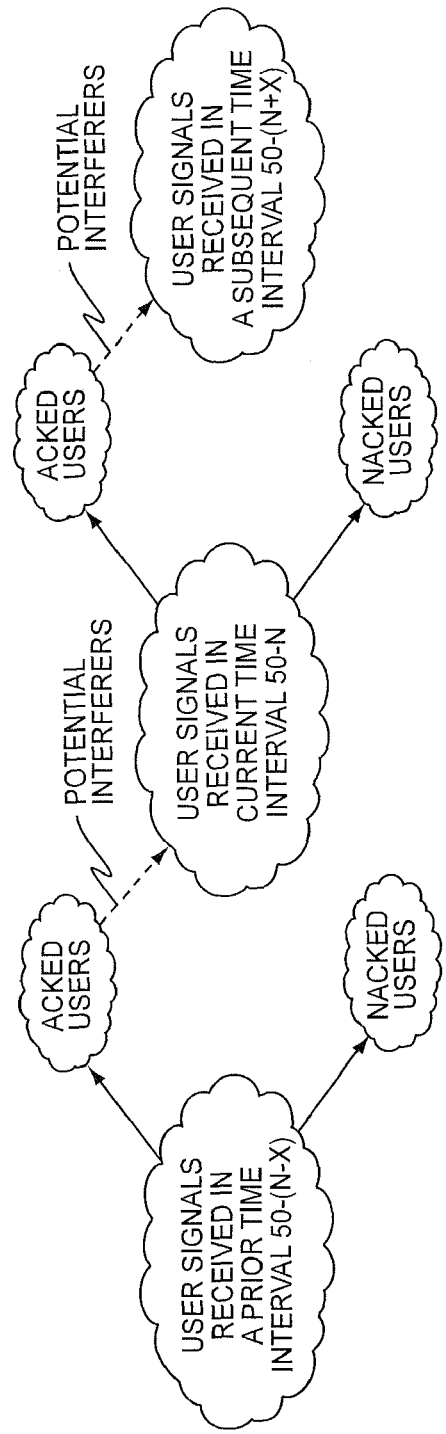
FIG. 6 is a diagram of examples of potentially interfering user scenarios, for a series of transmission time intervals, shown with respect to given (and, possibly, dynamically changing) groups of users.

Thus, a user that is nacked in a given interval represents a known, planned-for retransmission in a later interval, where that retransmission is accommodated by the transceiver 12 as part of its ongoing scheduling and allocation operations. Thus, it is the users for which acknowledgment signals are sent in a given time interval that represent the potentially interfering users in a subsequent time interval. FIG. 6 illustrates this situation for a current time interval 50-N, a prior time interval 50-(N−x), and a future time interval 50-(N+x). Here, N is an integer, and x is another integer, e.g., 1, 2, 3, 4, etc., depending on the number of intervals separating original transmissions and retransmissions. One sees that, for each interval, the users whose signals are successfully decoded and acknowledged become the subset of potentially interfering users for the next interval.

Figure 7:
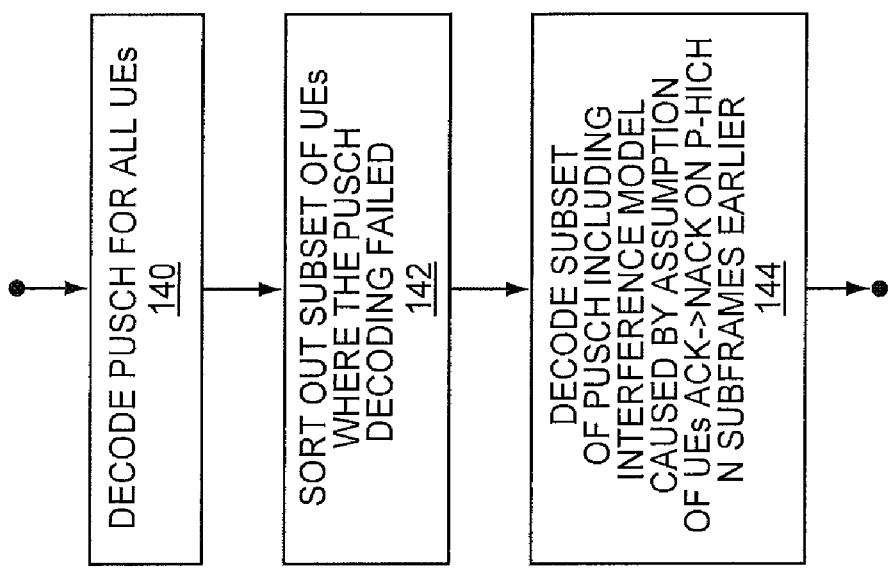
FIG. 7 is a logic flow diagram of one embodiment of a method of processing for improved signal reception at a wireless communication transceiver operating in an LTE network using H-ARQ.

FIG. 7 provides an LTE-specific example of the above scenario. The illustrated processing applies to a current time interval—LTE subframe—that is one among a repeating series of LTE sub-frames on the Physical Uplink Shared Channel (PUSCH). Further, the first user signal is a given user equipment signal (UE) signal among a potential plurality of UE signals received by an eNodeB on the Physical Uplink Shared Channel (PUSCH) for the current LTE sub-frame.

The method comprises decoding the PUSCH for all UEs transmitting in the current subframe (Block 140). Processing continues with the eNodeB sorting out the subset of UEs where the PUSCH decoding failed (Block 142). For these failed user signals, processing continues with decoding one or them according to the compensated decoding taught herein (Block 144), wherein an interference model is based on the eNodeB assuming that one or more UEs mistakenly retransmitted in the current subframe, based on incorrectly interpreting the acknowledgment signal(s) transmitted by the eNodeB in a prior subframe.

For those UE signals received on the PUSCH and successfully decoded by the eNodeB in the current subframe, the eNodeB may send one or more of the corresponding acknowledgement signals on the Physical Hybrid-ARQ Indicator Channel (PHICH) at a lowered reliability. For example, sending the one or more acknowledgement signals on the PHICH at a lowered reliability comprises ranking those user signals that were received and successfully decoded in the given LTE sub-frame according to their respective channel resource allocations, and choosing in rank order some number of those user signals to be acknowledged at a lowered reliability. Additionally, or alternatively, sending one or more acknowledgment signals on the PHICH at a lowered reliability comprises selectively lowering a transmit power for one or more of the acknowledgment signals to be sent in the current LTE sub-frame, as needed to limit an overall transmit power used for transmitting on the PHICH in the given LTE sub-frame.

Figure 8:
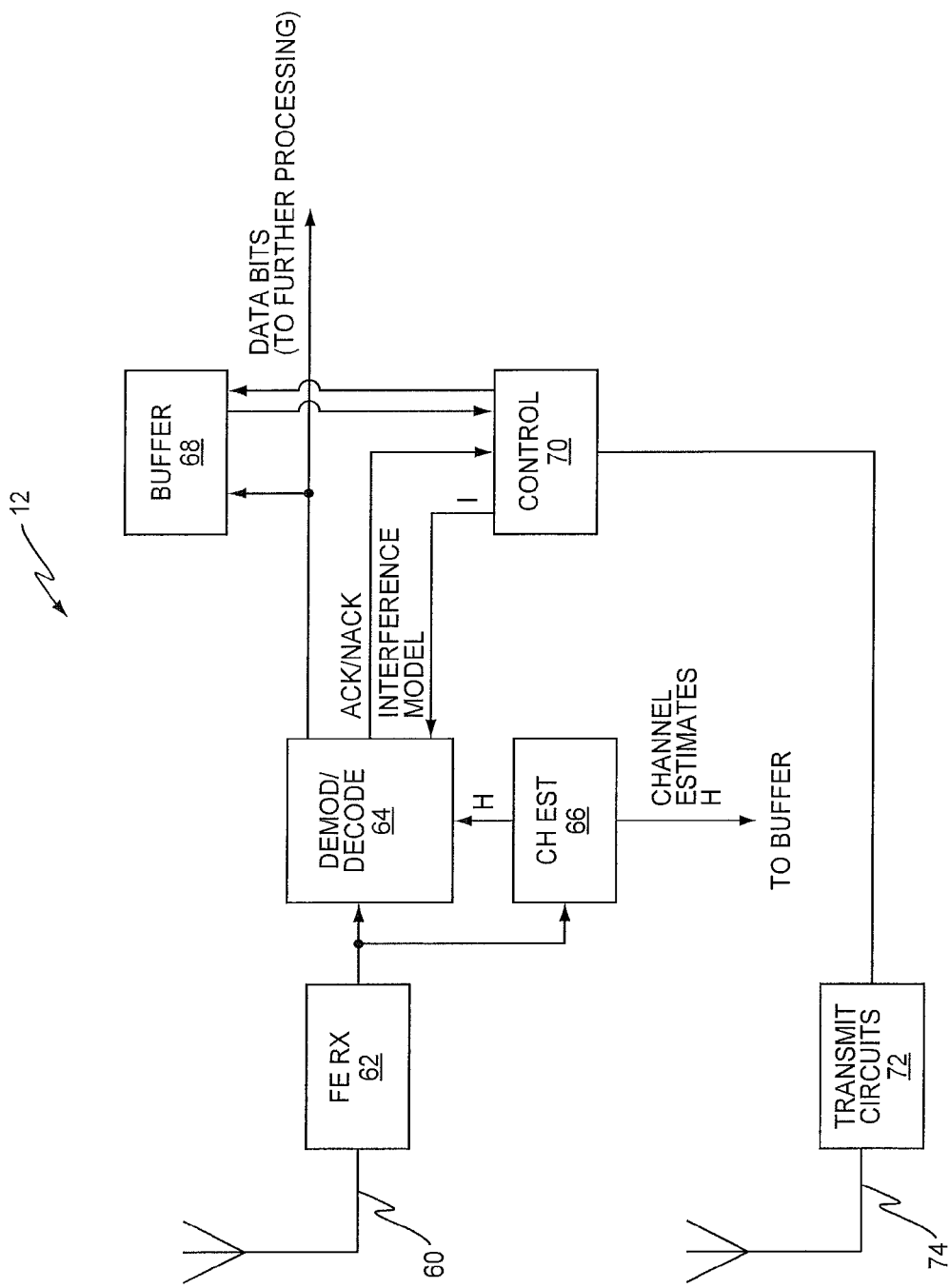
FIG. 8 is a block diagram of one embodiment of a wireless communication receiver, such as may be included in the wireless communication transceiver of FIG. 1.

Turning from method examples to circuit implementation examples, FIG. 8 illustrates one embodiment of the transceiver 12. Of course, those skilled in the art will appreciate that the transceiver 12 may be a complex processing arrangement, including multiple computer-based processing and communication circuits. FIG. 8 therefore provides a simplified but useful functional circuit presentation.

In the diagram, the wireless communication transceiver 12 comprises one or more receive antennas 60, receiver front-end circuits 62, demodulation/decoding circuits 64, channel estimation circuits 66, signal buffering circuits 68, one or more control circuits 70, and transmit circuits 72 that are associated with one or more transmit antennas 74. (Note that the receiver and transmitter circuits may share antennas.)

The receiver front-end circuits 62 generally include filters, amplifiers, mixers, and digitizers, for filtering antenna-received signals, applying gain control, converting them to baseband or IF, and digitizing them, to provide streams of digital samples corresponding to the antenna-received signals. The demodulation and decoding circuits 64 are configured to perform symbol detection and decoding, where decoded signal data may be buffered temporarily in buffer circuits 68—e.g., successfully decoded signals may be temporarily buffered for use in retransmission interference estimation in a later time interval.

Further, the demodulation and decoding circuits 64 operate in cooperation with the control circuit 70, which determines whether compensated decoding of given user signals is used, and which provides the interference model information to the demodulation and decoding circuits 64, for use in compensated decoding. Such information may be the particular user or users that are assumed to be the cause of hypothesized retransmission interference, along with any ranking or other information, iteration control for iterative, compensated decoding, etc. The control circuit 70 also may be operatively associated with the transmit circuits 72, such as for controlling the reliability of acknowledgment signal transmissions. (The transmit circuitry 30 of FIG. 4 may be located in the transmit circuits 72, for example.)

In at least one embodiment, the demodulation and decoding circuits 64 and the control circuit 70 are implemented as programmed/programmable digital processing circuits. As such, these circuits comprise, in one or more embodiments, one or more microprocessor-based circuits that are configured to implement one or more aspects of the compensated decoding method, based on executing stored computer program instructions. In such embodiments, it will be understood that the transceiver 12 includes one or more memory circuits (e.g., FLASH, EEPROM, etc.), or some other computer-readable medium, storing such program instructions.

In any case, with FIG. 8 serving as a non-limiting example, the transceiver 12 is configured to receive and decode user signals, and it comprises receiver circuits 62 that are configured to receive a first user signal in a current time interval, on channel resources allocated to the first user signal in the current time interval, and further comprises decoding and control circuits 64 and 70.

The decoding and control circuits 64 and 70 are configured to initially decode the first user signal without compensating for retransmission interference. If the initial decoding fails, these circuits perform compensated decoding of the first user signal. As such, these circuits are configured to hypothesize that a potentially interfering user mistakenly retransmitted in the current time interval on some or all of the same channel resources allocated to the first user signal and correspondingly generate an estimate of retransmission interference. They are further configured to obtain a compensated first user signal by compensating the first user signal according to the estimated retransmission interference, and decode the compensated first user signal.

In at least one embodiment, the control circuit 70 is configured to generate the estimate of retransmission interference by generating a channelized signal representing an estimate of what would have been received by the wireless communication transceiver if the potentially interfering user had mistakenly retransmitted in the current time interval, and generating the estimate of retransmission interference in the first user signal as a function of the channelized signal. Here, the control circuit 70 makes use of the channel estimates corresponding to the user signals of interest, which, for example, are buffered in the buffer circuits 68.

In particular, in one embodiment, the control circuit 70 is configured to generate the estimate of retransmission interference by forming a regenerated signal according to buffered decoded data that was successfully obtained from an earlier-received user signal corresponding to the hypothesized mistaken retransmission, and according to buffered channel estimates determined for the earlier-received user signal. The control circuit 70 reads this data from the buffer circuits 68, generates the estimate of retransmission interference as a function of the regenerated signal, and provides the estimate of retransmission interference to the demodulation and decoding circuits 64, for creating the compensated first user signal, to be used in the compensated decoding attempt. Of course, the control circuit 70 also may be configured to create the compensated first user signal, and then control the demodulation and decoding circuits 64, such that they decode the compensated user signal. In that regard, compensation may be done before symbol detection (demodulation), or afterwards.

For example, referring to FIG. 9, one sees two users, User 1 and User 2, transmitting in a given UL subframe n, on indicated radio bearer (RB) numbers. The figure assumes that eNodeB (abbreviated as eNB in the figure) generates acks for both users and sends the acks in a DL subframe, and further assumes that User 1 mistakes its received ack signal as a nack signal (PHICH ACK→NACK). Still further, the figure assumes that the UL resources that were previously allocated to User 1 in UL subframe n are allocated to another user, User 3, in a later UL subframe n+m. (This reallocation is appropriate from the perspective of the eNB, as it sent an acknowledgment to User 1 for the transmission from User 1 in subframe n, and the eNB thus considers those UL resources as available for reallocation in subsequent UL subframes.)

As such, one sees that the mistaken retransmission by User 1 overlaps with the new transmission from User 3. In this case, the eNB compensates the received signal from User 3 for interference caused by the mistaken retransmission from User 1, where such compensation is applied before or after signal demodulation.

As noted before, the control circuit 70 may be configured to compensate only for the most significant and/or most likely one or ones of the potentially interfering users, or at least order its compensation iterations to try compensating for those users first. As such, it will be understood that the buffer 68 may store channel allocation information that allows the control circuit 70 to recognize which users used which channel resources in one or more prior intervals, and recognize, optionally, whether any of those users were acknowledged using lower-reliability acknowledgment signals.

In one example embodiment, the transceiver 12 is an eNodeB configured for operation in an LTE network. Any given time interval is one among a repeating series of LTE subframes on the Physical Uplink Shared Channel (PUSCH), and wherein the first user signal is a given user equipment (UE) signal among a potential plurality of UE signals received on the PUSCH for the current LTE sub-frame. Here, the transceiver 12 is further configured to, for those UE signals received on the PUSCH and successfully decoded by the transceiver 12 in any given LTE sub-frame, send one or more acknowledgement signals on a Physical Hybrid-ARQ Indicator Channel (PHICH) at a lowered reliability.

The transceiver 12 may, for example, send the one or more acknowledgement signals on the PHICH at a lowered reliability by ranking those user signals that were received and successfully decoded in the given LTE sub-frame according to their respective channel resource allocations, and choosing in rank order some number of those user signals to be acknowledged at a lowered reliability. The transceiver 12 also may be configured to send the one or more acknowledgment signals on the PHICH at a lowered reliability based on selectively lowering a transmit power for one or more of the acknowledgment signals to be sent in the current LTE sub-frame, as needed to limit an overall transmit power used for transmitting on the PHICH in the given LTE sub-frame.

As a simple example, assume at least one out of T PHICH groups is populated with $0<K\leq 8$ UEs and all UEs in that group are to be sent an ACK. Thus, total PHICH group transmit power given that the probability of misinterpreting an acknowledgment signal as a non-acknowledgment signal $(Pr\{ACK\rightarrow NACK\}=10^{-3})$ must be satisfied accumulates to $$P_{tot} = \sum_{i=1}^{T\cdot K} G_i^2.$$

Consider the case where the available power for the PHICH groups in question is $P_{avail}<P_{tot}$, either due to physical constraints or due to the desire to save power in the transceiver 12. Then, at least one UE needs to be assigned less power and thus its error event probability becomes larger—i.e., it will be acknowledged at a lower reliability.

Further, assume that k>0 UEs in a group are to be assigned lower PHICH power. Let the accumulated UL resources of these UEs be $$\text{PUSCH\_alloc} = \sum_{i=1}^{T\cdot k} N_{UL\_PRB_i},$$

where $N_{UL\_PRB_i}$ is the UL allocation in terms of the number of physical resource blocks for the i-th UE. There are several strategies to choose the at least one UE to be acknowledged at a reduced power.

Because any mistaken PHICH decoding can potentially cause interference in the UL, the transceiver 12 may be configured to carefully choose the UEs that are acknowledged at lowered reliabilities. For example, its computational resources and/or signal processing timing constraints may practically limit the number of reconstructed interferers it can use in its hypothesized retransmission interference (given that kT>>number of interferers $N_{interfer}$). Thus, the transceiver 12 may be configured to minimize k together with PUSCH alloc. This could be on the one hand started by lowering the power for the UE(s) that had the smallest UL assignment—in terms of bandwidth allocation, for example—associated with its/their PHICH until the aggregate required power for the PHICH group meets the available power, This can be expressed as $$\sum_{i=1}^{T\cdot K} G_i'^2 \le P_{avail},$$

where $G'_i$ is the (possibly modified) amplitude for UE i.

Another strategy strategically deciding whether to send acknowledgments at lower reliability takes another approach. Instead of lowering reliability for the acknowledgments sent to the lowest-risk UEs (in terms of the associated resource allocations for the signal(s) being acknowledged), the alternate strategy is based on lowering the acknowledgement signal power for the UE(s) with the largest (or second-largest, etc.) gain $G_i$, such that the number of UEs that may have to be hypothesized as interferers is lower. There is a trade-off between finding a suitable number k in dependence on lowering the acknowledgment signal gain $G_i$ for users having high gain settings, versus lowering the gain for those users that transmitted with large UL channel resource allocations.

Regardless of the particular strategy used, for the example case of LTE, applying the contemplated method increases the robustness of PUSCH transmission that might be subject to time-frequency interference caused by UEs that mistook an ack as a nack, in their PHICH decoding. Advantageously, however, the induced interference potentially caused by this type of mistake is known to the transceiver 12. That is, the transceiver 12 does not necessarily know that the given UE will mistake its acknowledgment signal as a non-acknowledgment signal, but the transceiver 12 does know what the mistaken retransmission will be, assuming it occurs.

In more detail, the transceiver knows that a failed PHICH ACK→NACK increases the redundancy version by one, and it knows the packet size, and in particular, it knows the transmitted bits of the original transmission, since that transmission was acknowledged only because it was correctly decoded. Hence, with channel measurements for the at least one potentially interfering UE, the transceiver 12 can reconstruct the interference that would be caused by that UE (or UEs) perfectly, or at least as well as the accuracy of the channel estimates allow.

Further, the transceiver 12 can be configured to dynamically use its compensated decoding, such as when its transmit power budget over a time interval becomes tight, for example due to physical constraints or other measures, or when processing timing budget is not exhausted. For example, the transceiver 12 may not use compensated decoding at all, even when user signal decoding fails, except in modes where the transceiver 12 sends some or all of its acknowledgment signals at lowered reliabilities.

Further, in any given time interval, for any given user signal, it may reconstruct the interference caused by one or more potentially interfering users one at time, where it compensates for one potentially interfering user, attempts compensated decoding, and moves on to the next potentially interfering user if that attempt fails. Or, its reconstruction can consider more than one potentially interfering user at a time—e.g., up to a predefined number $N_{interferer}$ of interferers. In either case, the transceiver 12 knows which channel resources would have been used by which potentially interfering users, and it thus can compensate different parts of the desired user signal, according to which user or users would have retransmitted on the channel resources corresponding to those different parts.

Of course, the present invention is not limited by the foregoing description, or by the accompanying drawings. Instead, the present invention is limited only by the claims and their legal equivalents.

What is claimed is:

1. A method of decoding user signals in a wireless communication transceiver comprising:
   receiving a first user signal in a current time interval, on channel resources allocated to the first user signal in the current time interval;
   decoding the first user signal by initially decoding the first user signal without compensating for retransmission interference, and, if said initial decoding of the first user signal fails, performing compensated decoding comprising:
      hypothesizing that a potentially interfering user mistakenly retransmitted in the current time interval on some or all of the same channel resources allocated to the first user signal and correspondingly generating an estimate of retransmission interference;
      obtaining a compensated first user signal by compensating the first user signal according to the estimated retransmission interference; and
      decoding the compensated first user signal.

2. The method of claim 1, wherein said step of generating the estimate of retransmission interference comprises generating a channelized signal representing an estimate of what would have been received by the wireless communication transceiver if the potentially interfering user had mistakenly retransmitted in the current time interval, and generating the estimate of retransmission interference as a function of the channelized signal.

3. The method of claim 1, wherein said step of generating the estimate of retransmission interference comprises forming a regenerated signal at the wireless communication transceiver according to decoded data successfully obtained from an earlier-received user signal corresponding to the hypothesized mistaken retransmission, and according to channel estimates determined for the earlier-received user signal, generating the estimate of retransmission interference as a function of the regenerated signal.

4. The method of claim 1, wherein said step of performing compensated decoding includes identifying the potentially interfering user as one or more other users that transmitted one or more user signals to the wireless communication transceiver in a prior time interval, using some or all of the same channel resources as allocated to the first user signal in the current time interval.

5. The method of claim 4, further comprising determining which ones of said one or more other users are the most significant potential interferers, and performing said steps of obtaining and decoding using the estimates of retransmission interference as generated for at least one of the most significant potential interferers.

6. The method of claim 4, further comprising determining which ones of said one or more other users are the most likely potential interferers based on reliabilities at which acknowledgement signals were sent to those one or more other users in the prior time interval, and performing said steps of obtaining and decoding using the estimates of retransmission interference as generated for at least one of the most likely potential interferers.

7. The method of claim 1, wherein said step of hypothesizing comprises identifying, according to channel resource allocation and acknowledgment signal reliability information retained by the wireless communication transceiver from a prior time interval, one or more other users that successfully transmitted user signals to the wireless communication transceiver in the prior time interval using some or all of the same channel resources as allocated to the first user signal in the current time interval, and that are most likely to have mistakenly retransmitted in the current time interval.

8. The method of claim 1, wherein the method includes receiving some number of user signals in each of a series of repeating time intervals, including the current time interval, and, for the user signals received in any given time interval:
    decoding them and generating Automatic Repeat reQuest (ARQ) response signals for individual ones of them in dependence on whether decoding succeeds or fails; and
    retaining information indicating the channel resource allocations used for those user signals that were successfully decoded, and indicating reliabilities or differences in reliabilities for at least some of the ARQ response signals sent for those user signals that were successfully decoded; and
using the retained information from a prior time interval in a subsequent time interval, to identify potentially interfering users with respect to a given user signal that fails decoding.

9. The method of claim 1, wherein the current time interval is one among a repeating series of Long Term Evolution (LTE) sub-frames on a Physical Uplink Shared Channel (PUSCH), and wherein the first user signal is a given user equipment signal (UE) signal among a potential plurality of UE signals received on the PUSCH for a current LTE sub-frame, and wherein the method further comprises, for those UE signals received on the PUSCH and successfully decoded by the wireless communication transceiver in any given LTE sub-frame, sending one or more acknowledgement signals on a Physical Hybrid-ARQ Indicator Channel (PHICH) at a lowered reliability.

10. The method of claim 9, wherein said sending the one or more acknowledgement signals on the PHICH at the lowered reliability comprises, ranking those user signals that were received and successfully decoded in the given LTE sub-frame according to their respective channel resource allocations, and choosing in rank order some number of those user signals to be acknowledged at a lowered reliability.

11. The method of claim 9, wherein said sending one or more acknowledgment signals on the PHICH at the lowered reliability comprises selectively lowering a transmit power for one or more of the acknowledgment signals to be sent in the current LTE sub-frame, as needed to limit an overall transmit power used for transmitting on the PHICH in the given LTE sub-frame.

12. A wireless communication transceiver configured to receive and decode user signals, said wireless communication transceiver comprising:
    receiver circuits configured to receive a first user signal in a current time interval, on channel resources allocated to the first user signal in the current time interval; and
    decoding and control circuits configured to:
        initially decode the first user signal without compensating for retransmission interference; and
        if the initial decoding fails, perform compensated decoding of the first user signal, wherein the decoding and the control circuits are configured to:
            hypothesize that a potentially interfering user mistakenly retransmitted in the current time interval on some or all of the same channel resources allocated to the first user signal and correspondingly generate an estimate of retransmission interference;
            obtain a compensated first user signal by compensating the first user signal according to the estimated retransmission interference; and
            decode the compensated first user signal.

13. The wireless communication transceiver of claim 12, wherein the control circuit is configured to generate the estimate of retransmission interference by generating a channelized signal representing an estimate of what would have been received by the wireless communication transceiver if the potentially interfering user had mistakenly retransmitted in the current time interval, and generating the estimate of retransmission interference in the first user signal as a function of the channelized signal.

14. The wireless communication transceiver of claim 12, wherein the wireless communication transceiver comprises a channel estimator configured to generate channel estimates for received user signals, and wherein the control circuit is configured to generate the estimate of retransmission interference by forming a regenerated signal according to buffered decoded data that was successfully obtained from an earlier-received user signal corresponding to the hypothesized mistaken retransmission, and according to buffered channel estimates determined for the earlier-received user signal, and generate the estimate of retransmission interference as a function of the regenerated signal.

15. The wireless communication transceiver of claim 12, wherein the control circuit is configured to identify the potentially interfering user as one or more other users that transmitted one or more user signals to the wireless communication transceiver in a prior time interval, using some or all of the same channel resources as allocated to the first user signal in the current time interval.

16. The wireless communication transceiver of claim 15, wherein the control circuit is configured to determine which ones of said one or more other users are the most significant potential interferers, and perform said steps of obtaining and decoding by using the estimates of retransmission interference as generated for at least one of the most significant potential interferers.

17. The wireless communication transceiver of claim 15, wherein the control circuit is configured to determine which ones of said one or more other users are the most likely potential interferers based on reliabilities at which acknowledgement signals were sent to those one or more other users in the prior time interval, and perform said steps of obtaining and decoding by using the estimates of retransmission interference as generated for at least one of the most likely potential interferers.

18. The wireless communication transceiver of claim 12, wherein the control circuit is configured to perform said step of hypothesizing by identifying, according to channel resource allocation and acknowledgment signal reliability information retained by the wireless communication transceiver from a prior time interval, one or more other users that successfully transmitted user signals to the wireless communication transceiver in the prior time interval using some or all of the same channel resources as allocated to the first user signal in the current time interval, and that are most likely to have mistakenly retransmitted in the current time interval.

19. The wireless communication transceiver of claim 12, wherein the wireless communication transceiver is configured to:

receive some number of user signals in each of a series of repeating time intervals, including the current time interval, and, for the user signals received in any given time interval:

decode them and generate Automatic Repeat reQuest (ARQ) response signals for individual ones of them in dependence on whether decoding succeeds or fails; and retain information indicating the channel resource allocations used for those user signals that were successfully decoded, and indicating reliabilities or differences in reliabilities for at least some of the ARQ response signals sent for those user signals that were successfully decoded; and use the retained information from a prior time interval in a subsequent time interval, to identify potentially interfering users with respect to a given user signal in the subsequent time interval that fails decoding.

20. The wireless communication transceiver of claim 12, wherein the current time interval is one among a repeating series of LTE sub-frames on a Physical Uplink Shared Channel (PUSCH), and wherein the first user signal is a given user equipment (UE) signal among a potential plurality of UE signals received on the PUSCH for a current LTE sub-frame, and wherein the wireless communication transceiver is further configured to, for those UE signals received on the PUSCH and successfully decoded by the wireless communication transceiver in any given LTE sub-frame, send one or more acknowledgement signals on a Physical Hybrid-ARQ Indicator Channel (PHICH) at a lowered reliability.

21. The wireless communication transceiver of claim 20, wherein the wireless communication transceiver is configured to send the one or more acknowledgement signals on the PHICH at the lowered reliability by ranking those user signals that were received and successfully decoded in the given LTE sub-frame according to their respective channel resource allocations, and choosing in rank order some number of those user signals to be acknowledged at a lowered reliability.

22. The wireless communication transceiver of claim 20, wherein the wireless communication transceiver is configured to send the one or more acknowledgment signals on the PHICH at the lowered reliability based on selectively lowering a transmit power for one or more of the acknowledgment signals to be sent in the current LTE sub-frame, as needed to limit an overall transmit power used for transmitting on the PHICH in the given LTE sub-frame.

\* \* \* \* \*

UNITED STATES PATENT AND TRADEMARK OFFICE
CERTIFICATE OF CORRECTION

| | | |
|---|---|---|
| PATENT NO. | : 8,249,011 B2 | Page 1 of 1 |
| APPLICATION NO. | : 12/635304 | |
| DATED | : August 21, 2012 | |
| INVENTOR(S) | : Lindoff et al. | |

It is certified that error appears in the above-identified patent and that said Letters Patent is hereby corrected as shown below:

In Column 8, Line 49, delete "than" and insert -- then --, therefor.

In Column 9, Line 53, delete "or" and insert -- of --, therefor.

In Column 13, Line 4, delete "$N_{interfer}$)." and insert -- $N_{interferer}$). --, therefor.

In Column 17, Line 7, in Claim 19, delete "interval:" and insert -- interval; --, therefor.

Signed and Sealed this
Eleventh Day of December, 2012

David J. Kappos
*Director of the United States Patent and Trademark Office*